United States Patent
Anders

(10) Patent No.: US 7,551,732 B2
(45) Date of Patent: *Jun. 23, 2009

(54) CENTRALIZED VOICE OVER IP RECORDING AND RETRIEVAL METHOD AND APPARATUS

(75) Inventor: Joseph Clifton Anders, Mobile, AL (US)

(73) Assignee: **Global Tel*Link Corporation**, Mobile, AL (US)

(*) Notice: Subject to any disclaimer, the term of this patent is extended or adjusted under 35 U.S.C. 154(b) by 306 days.

This patent is subject to a terminal disclaimer.

(21) Appl. No.: 11/005,816

(22) Filed: Dec. 7, 2004

(65) Prior Publication Data

US 2005/0141678 A1 Jun. 30, 2005

Related U.S. Application Data

(60) Provisional application No. 60/527,918, filed on Dec. 8, 2003.

(51) Int. Cl.
*H04M 3/53* (2006.01)
(52) U.S. Cl. .................. 379/191; 370/235; 379/85; 379/88.17; 379/88.26; 379/112.01; 380/283; 455/411; 455/413
(58) Field of Classification Search ............. 379/67.1, 379/85, 88.04, 135, 35, 191, 68, 88.17, 88.26, 379/112.01, 265.06; 710/71; 380/283; 370/235; 455/411, 413

See application file for complete search history.

(56) References Cited

U.S. PATENT DOCUMENTS

| 5,168,556 | A | * | 12/1992 | Lajtai et al. ............... 710/71 |
| 5,535,261 | A | | 7/1996 | Brown et al. |
| 5,943,403 | A | * | 8/1999 | Richardson et al. ...... 379/88.26 |
| 6,052,454 | A | | 4/2000 | Kek et al. |
| 6,058,163 | A | * | 5/2000 | Pattison et al. ......... 379/265.06 |
| 6,072,860 | A | | 6/2000 | Kek et al. |
| 6,078,648 | A | * | 6/2000 | Albers et al. ............ 379/35 |
| 6,233,313 | B1 | * | 5/2001 | Farris et al. ............ 379/112.01 |

(Continued)

FOREIGN PATENT DOCUMENTS

GB 2 391 743 A 2/2004

(Continued)

OTHER PUBLICATIONS

PCT International Search Report, Nov. 30, 2005.

(Continued)

*Primary Examiner*—Gerald Gauthier
(74) *Attorney, Agent, or Firm*—Dority & Manning, P.A.

(57) ABSTRACT

The present subject matter is directed to an apparatus and methodology for recording, at a central data center, telephone conversations originating from remote locations. The present subject matter has particular utility to the penal (corrections) environment in that it discloses a methodology for recording and storing voice and related data at a central data center remote from either the origination or destination locations of a telephone call placed by an inmate in a prison or other facility. The disclosed technology permits storage of both voice and call related data at a remote facility in such a manner that the data is searchably accessible by authorized personnel at other remote locations by way of network or Internet connection to the central data center.

27 Claims, 2 Drawing Sheets

U.S. PATENT DOCUMENTS

| | | |
|---|---|---|
| 6,381,262 B1 | 4/2002 | Ogino |
| 6,404,857 B1 * | 6/2002 | Blair et al. .................. 379/67.1 |
| 6,529,602 B1 * | 3/2003 | Walker et al. ............... 380/283 |
| 6,553,336 B1 * | 4/2003 | Johnson et al. ............. 702/188 |
| 6,920,209 B1 * | 7/2005 | Gainsboro .................. 379/188 |
| 6,987,841 B1 * | 1/2006 | Byers et al. .............. 379/88.17 |
| 7,027,398 B2 * | 4/2006 | Fang .......................... 370/235 |
| 7,058,163 B1 * | 6/2006 | Parekh et al. ................. 379/85 |
| 7,106,843 B1 * | 9/2006 | Gainsboro et al. .......... 379/191 |
| 7,333,798 B2 * | 2/2008 | Hodge ........................ 455/411 |
| 2004/0132432 A1 * | 7/2004 | Moores et al. .............. 455/413 |

FOREIGN PATENT DOCUMENTS

KR  2003-0060413  7/2003

OTHER PUBLICATIONS

Examination Report for UK Application No. GB 0514810.1 dated Feb. 2, 2007.

* cited by examiner

CENTRALIZED VOICE OVER IP RECORDING AND RETRIEVAL METHOD AND APPARATUS

PRIORITY CLAIM

This application claims the benefit of U.S. Provisional Application No. 60/527,918, entitled "CENTRALIZED VOICE OVER IP RECORDING AND RETRIEVAL METHOD AND APPARATUS", filed Dec. 8, 2003, which is incorporated herein by reference for all purposes.

BACKGROUND OF THE INVENTION

The present subject matter relates generally to a method and apparatus for recording telephone conversations. More particularly, the present subject matter relates to a method and apparatus for recording, at a centralized location, telephone conversation conducted at remote locations. The present subject matter further includes aspects involving information storage and retrieval involving recorded conversations.

The present subject matter is directed in one aspect, although not exclusively, towards the penal (i.e., corrections) environment. Various law enforcement entities find it desirable, even necessary (for example, such as required by law or circumstances), to record some or all telephone conversations conducted by inmates in penal institutions or other detainees in similar facilities. Highly specialized telecommunications equipment and facilities must be provided to meet the various needs of governmental officials and others in addressing the desire to monitor and/or record telephone conversations under varying circumstances. As a non-limiting example, the remainder of the present disclosure will refer to the recording of telephone conversations within the above noted particular environment. It is to be strictly understood, however, that the present technology may be applied to and/or used within other areas where recording of conversations may be of interest. For example, it may be desirable, for training or other purposes, to record conversations involving sales personnel who might be involved with soliciting sales or taking orders from customers. Alternatively, there could be an interest in recording, for training or other purposes, conversations involving persons involved with information exchange such as technical assistants who may provide instruction or assistance to individuals seeking technical support involved with various equipment, computer software or other areas where a user or operator may require assistance in understanding, operating, using, etc. various items or agencies of interest to the individuals involved. As such, it should be understood that the present technology has applicability to any situation where there is a need or desire to record, categorize, store, search, retrieve and/or replay telephone conversations.

It has been common practice for many years in the penal (corrections) environment to record and/or monitor inmates' conversations. Such recording and monitoring takes place in the very controlled atmosphere of permitted inmate communications with individuals outside of the facilities housing prisoners or inmates. Normally prisoners are limited to a small number of individuals that they are permitted to call. These may include family members, their lawyers, and friends and may specifically exclude others, for example judges, jury members, witnesses, former co-conspirators and other like individuals to whom calls from a particular inmate may be of a harassing or other undesired nature. There may be time of day, length of call, three-way call or other restrictions on calls, all of which must be controlled by way of various instrumentalities that may include computer controlled equipment at the facility and/or at remote locations in addition to human monitoring and/or control. In almost all instances, such telephone calls must be recorded; yet even in those instances, there are conditions that may impact on the desire, ability, or legal right to record such conversations. For example, it is inappropriate to record or monitor conversations between an inmate and his/her attorney, and thus, measures must be taken to insure that, where calls are made from an inmate to his/her attorney, no recording is made or monitoring is allowed.

The particular needs described above have been addressed in the prior art, which, in major part, has provided responses to accommodate the majority of the needs addressed. Examples of such include LazerPhone™ and LazerVoice®, products provided by the assignee of the present subject matter. LazerPhone™ is a centralized, PC-based, integrated telephone system with features that provide control of inmate telecommunications activities. The system provides call blocking and monitoring, account control including personal identification number (PIN) setup and control, report generation including automated trouble reports, call activity reports and other administrative reports as well as numerous other features.

LazerVoice® is an optional feature of LazerPhone™ and provides a recording function for the LazerPhone™ system. LazerVoice® is a modular system that provides the ability to record at its installation site selected telephone conversations, permit monitoring by appropriate authorities of selected conversations, and store for later retrieval recorded conversations as well as other functions and operations involving the recording of telephone conversations. Additional information regarding these products may be found at the World Wide Web site, www.gtl.us, of the corporate owner of the present application interests.

While it is considered well known that the recording of inmate telephone conversations is advantageous to governmental agencies and appropriate authorities in that information regarding the security of facilities and general continuing or past criminal activity may be found in such recordings, retaining the recordings of the inmate calls presents a substantial challenge as the data becomes large very quickly. Maintaining these large stores of recorded conversations at the facilities or creating data warehouses in remote locations with limited environmental controls is problematic. Due to the shear size of the recordings, attempting to move them from the sites requires very high bandwidth, which is prohibitively expensive. Additionally, if the recordings are stored away from the site, the ability to conduct investigations is hampered due to the time necessary to copy the recording back to the local computer for playback. Finally, if the recordings are simply stored at a single facility, such may hamper investigations that may need to be conducted from various locations.

While various aspects and alternative features are known in the field of telecommunications and telephone conversation recording, no one design has emerged that generally integrates all of the ideal features and performance characteristics as discussed herein.

SUMMARY OF THE INVENTION

The present subject matter recognizes and addresses several of the foregoing shortcomings, and others concerning certain aspects of recording telephone conversations within a penal (corrections) environment.

Thus, broadly speaking, aspects of some embodiments of the presently disclosed technology concern the provision of improved apparatus and corresponding methodology to provide for the recording of telephone conversation(s). More particularly, certain aspects of some embodiments of the disclosed technology relate to an improved apparatus and corresponding methodology using digital technology, the provision and practice of which will help insure that recorded telephone conversations will have the maximum possible availability to authorized personnel.

Another aspect of certain embodiments of the present subject matter is to provide an improved apparatus and corresponding methodology that provides safe, secure and virtually unlimited off-site storage of recorded data.

A further aspect of certain embodiments of the present subject matter is to provide an improved apparatus and corresponding methodology for conveniently searching a database, and accessing and reviewing data records including previously recorded telephone conversations stored at a remote location.

A still further aspect of certain embodiments of the present subject matter is to provide an improved apparatus and corresponding methodology for accessing and monitoring real-time telephone conversations.

Additional aspects and advantages of the present subject matter are set forth in or will be apparent to those of ordinary skill in the art from the detailed description herein. Also, it should be further appreciated by those of ordinary skill in the art that modifications and variations to the specifically illustrated, referenced, and discussed features and steps hereof may be practiced in various embodiments and uses of this subject matter without departing from the spirit and scope thereof, by virtue of present reference thereto. Such variations may include, but are not limited to, substitution of equivalent means and features, materials, or steps for those shown, referenced, or discussed, and the functional, operational, or positional reversal of various parts, features, steps, or the like.

Still further, it is to be understood that different embodiments, as well as different presently preferred embodiments, of this subject matter may include various combinations or configurations of presently disclosed features, steps, or elements, or their equivalents (including combinations of features or steps or configurations thereof not expressly shown in the figures or stated in the detailed description).

A first exemplary embodiment of the present subject matter relates to an improved apparatus and corresponding methodology for digitizing voice audio from telephone conversations and storing corresponding digital files for later use.

Another exemplary embodiment of the present subject matter relates to an improved apparatus and corresponding methodology for digitizing voice audio from telephone conversations and, in real time, making those conversations available for monitoring at remote locations by authorized individuals (or systems).

A more particular exemplary embodiment of the present technology relates to an improved apparatus and corresponding methodology for remotely converting telephone conversations into a digital format and storing digital files based on the converted telephone conversations in such a manner as to provide searchable access to the stored digital files from anywhere access to the Internet is available.

Still another particular exemplary embodiment of the present subject matter involves a specialized phone system for use in relation to a prison environment, having an audio recording system. Such a system may include a telephone instrument located at a first location situated within a prison facility; an analog to digital converter, having an input and an output, with the telephone instrument coupled to the input of such analog to digital converter; and a data storage device located at a second location comprising a defined central data center physically remote from the first location, which such data storage device being coupled to the output of the analog to digital converter. With such system, advantageously inmate conversation data from inmate conversations conducted by way of the telephone instrument at the prison facility may be recorded and stored at the central data center, physically remote from the prison facility.

Additional embodiments of the subject technology, not necessarily expressed in this summarized section, may include and incorporate various combinations of aspects of features, parts, or steps referenced in the summarized objectives above, and/or features, parts, or steps as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
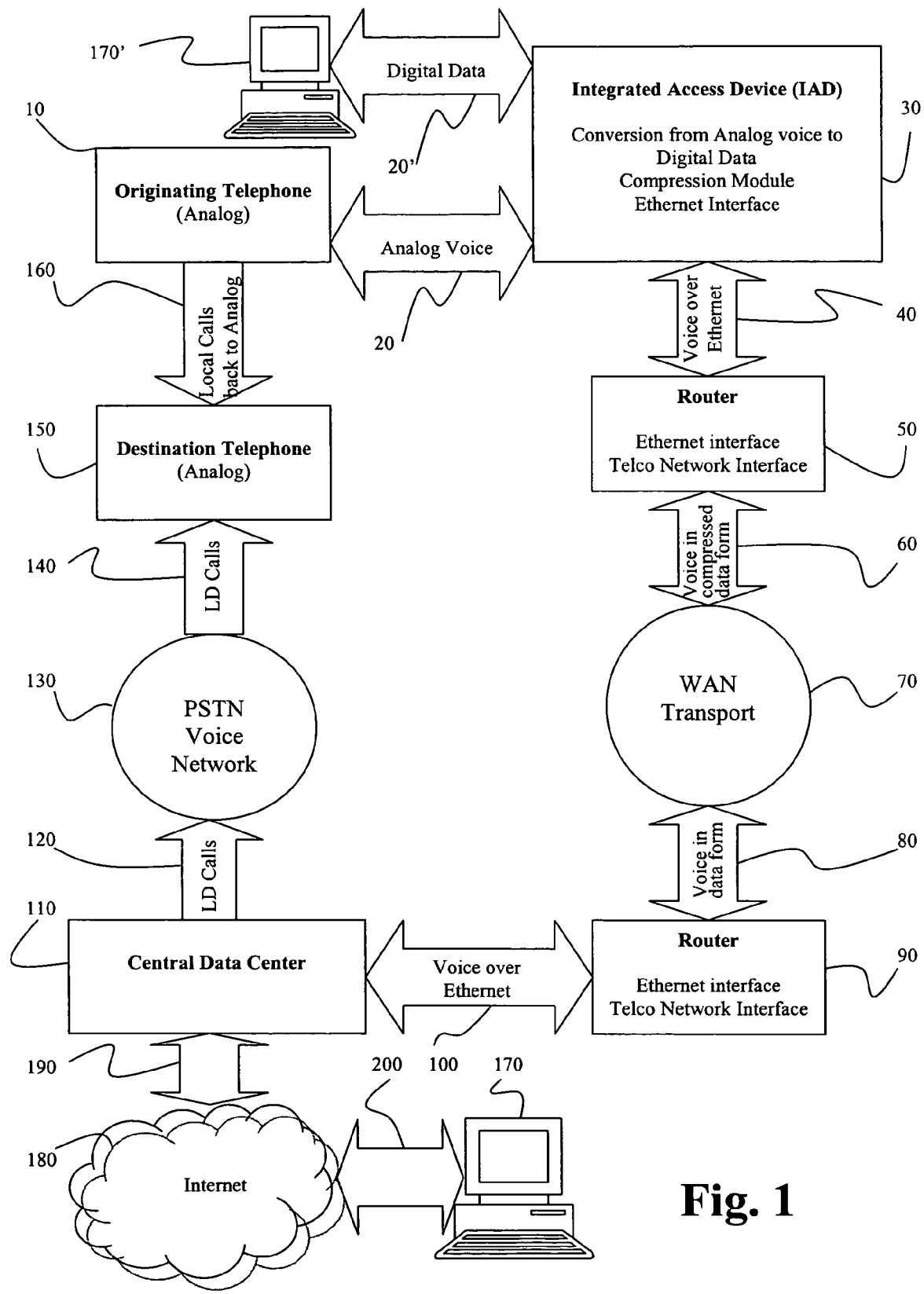
FIG. 1 is a generally representational block diagram illustrating an overview of the present subject matter.

Repeat use of reference characters throughout the present specification and appended drawings is intended to represent same or analogous features or elements of the present subject matter.

DETAILED DESCRIPTION OF THE DRAWINGS

As referenced in the Summary of the Invention section, supra, the present subject matter is directed towards an improved apparatus and corresponding methodology for recording telephone conversations.

Reference will now be made to the presently disclosed technology, specifically with reference to FIGS. 1 and 2. It will be observed from FIG. 1 that the present technology is directed to apparatus and a methodology for recording telephone conversations and storing the recorded conversations at a central data center 110. Further, the present technology provides an Integrated Access Device (IAD) 30 wherein voice signals are converted to a digital format and routed by way of a wide area network (WAN) transport mechanism to the central data center 110 for storage. IAD 30 may be embodied as a device more commonly known as a Voice over Internet Protocol (VoIP) Gateway. It is to be specifically understood, however, that the present technology does not require specific devices or systems for implementation but rather is more broadly directed to the inclusion of devices and systems designed to convert analog voice signals into a digital format suitable for transmission over a digital network. In addition, although not required for the present technology, the WAN may consist of the Internet, but may equally consist of a wide area network not directly connected, although possibly connectable, to the Internet. Variations of such aspect of the present subject matter are known to those of ordinary skill in the art, and form no particular aspect of the present subject matter. Such variations may also include subsequently developed technology, even though not presently in existence, for forming such transport aspects of the present broader subject matter.

The methodology of the present technology starts with an origination telephone 10, which, in the present example, may be used by inmates at a penal facility to make telephone calls. As discussed above, there are several aspects involved with an inmate actually placing a call that are not directly related to the present technology but which will be briefly described to provide a more complete description of the environment within which the present technology is employed. In the present environment, a prisoner will normally lift a handset to his or her ear and, without dialing any digits, be presented with one or more prompts, such as a series of prompts. In response to various of these prompts, an inmate may be required, for example, to provide a personal identification number (PIN), provide a selection of billing type, (collect, person-to-person, prepaid, etc.) provide a destination number, provide a voice identification for recording and playback to the called party, etc. In response to the responses provided by the inmate, the telephone system may respond, for example, by verifying account information provided, authorizing access to the telephone system, determining whether the conversation should be recorded, etc., all of which are significant to the overall operation of a telephone system within a corrections environment but which are of secondary importance to the present technology and, thus, will not be described in further detail except to say that the aspects involving verification of information provided and determination of whether access will be provided as well as determining whether a particular conversation is to be recorded may be determined by equipment or personnel either at the central data center 110 or at some other location. It is sufficient to say that, once an inmate is granted access to the telephone system and a conversation is in progress, if, during the authorization process, a determination was made that a recording of the conversation should take place, mechanisms and/or features are activated, for example, a flag may be set in control software, to accomplish or set in motion that goal.

The actual calling process begins at origination telephone 10. An inmate's conversation is carried as analog voice data 20 over a link to an Integrated Access Device (IAD) 30, which converts the analog voice information into digital data. The IAD 30 may be co-located at the same facility as the origination telephone or may be at a more remote location and coupled to the origination telephone through appropriate connecting lines including, but not limited to, the public switched telephone network (PSTN). If the inmate has placed a call to a local number, the voice audio is sent in analog form to the destination telephone 150. At the same time the voice information, which has been converted to digital data, is further processed by a compression module within IAD 30 into highly compressed data. This highly compressed data is then routed over data circuits to the central data center 110. As illustrated in FIG. 1, the data circuit includes respective routers 50 and 90, which provide Ethernet and telephone company (Telco) network interface functions and a WAN 70, which as previously discussed may consist of the Internet, an independent wide area network or any other network (now or later known) capable of transporting data. The data circuits also include coupling arrangements 40 and 100 for carrying Voice over an Ethernet, and coupling arrangements 60 and 80 for carrying Voice in Digital Data form. Once the Voice data reaches the central data center, they are stored as will be more fully described hereinafter. Data compression may be utilized in various transmissions.

Upon arrival at the central data center 110, the now highly compressed voice data may be further processed with an eye toward storage of the data. In this regard, at the end of the conversation, the entire conversation is written in the compressed data format to a file on the storage device 220 (FIG. 2) at the central data center 110. Also upon completion of the conversation, the file is closed and identifying information is written to a database with which the compressed conversation data is associated. The identifying information may include information necessary to retrieve the stored compressed conversation data and may include, but is not limited to, such information as prisoner's name, origination number, destination number, time and date of call, facility location, and any other such identifying information as may be desirable for any particular installation or circumstance.

If the call placed by the inmate was a long distance call, the voice data may be converted to a format suitable for coupling to the PSTN generally 130 for transport through appropriate coupling mechanisms 120, 140 to the destination telephone 150 to complete the call. As with the call authorization process discussed briefly above, the exact mechanism for completing a long distance call is not important to the present technology but rather the aspect of transporting the highly compressed voice data to the central data center regardless of the type of call made, local or long distance, is paramount.

Finally, before discussing the more specific aspects relating to the digital data/voice conversion facilities of the present technology, two additional items will be notice with respect to FIG. 1. In particular, attention is directed to workstation 170 and the representatively illustrated coupling of workstation 170 through a bi-directional coupling mechanism 200 to the central data center 110 through the Internet indicated with a general cloud-like representation 180 and the bi-directional coupling mechanism 190. Attention is also directed to workstation 170' and the representatively illustrated coupling of workstation 170' through a bi-directional coupling mechanism 20' to the Integrated Access Device 30. As represented by these illustrated relationships, the present technology may be used to couple a workstation 170 through any available connection 200 to the Internet and from there to the central data center 110 as well as couple a workstation 170' that may be associatively located with origination telephone 10 or IAD 30 back thru the WAN to the central data center 110. Workstations 170,170' may be provided with a web based application so that an operator my enter criteria for a search of the central database for recordings meeting such criteria. Upon execution of a query to the stored database 220 of the central data center 110, a list of matching call records is presented to the workstation operator. The operator may select from the matching call records and the call conversation data will be sent back to the requesting workstation 170 or 170' in a streaming format. At the workstations 170, 170' a converter is provided that converts the compressed conversation data on the fly into a standard Windows ".wav" format. This transfer method allows for evaluation of the call during the data transfer process, thus removing the delay in waiting for the entire file to download prior to review.

Workstations 170, 170' may also be used to monitor real-time conversations in a manner similar to retrieving and monitoring stored conversations. A workstation operator may, for example, have previously entered search criteria with an indication that, should a call matching the criteria occur, notice and opportunity to monitor such call should be issued to an appropriate authority. Workstations 170, 170' may also be used for a number of other purposes including, but not limited to, control of certain operational aspects within the central data center 110. Such operational aspects may include, but are not limited to, manipulation of inmate or corrections facility account information, generation of operational and billing reports and other such functions as may be necessary and/or allowed for users or operators of the telephone system in general but are not specifically related to and a part of the voice data recording, storing, search, retrieval, and playback capability which is specifically a part of the presently disclosed technology.

Figure 2:
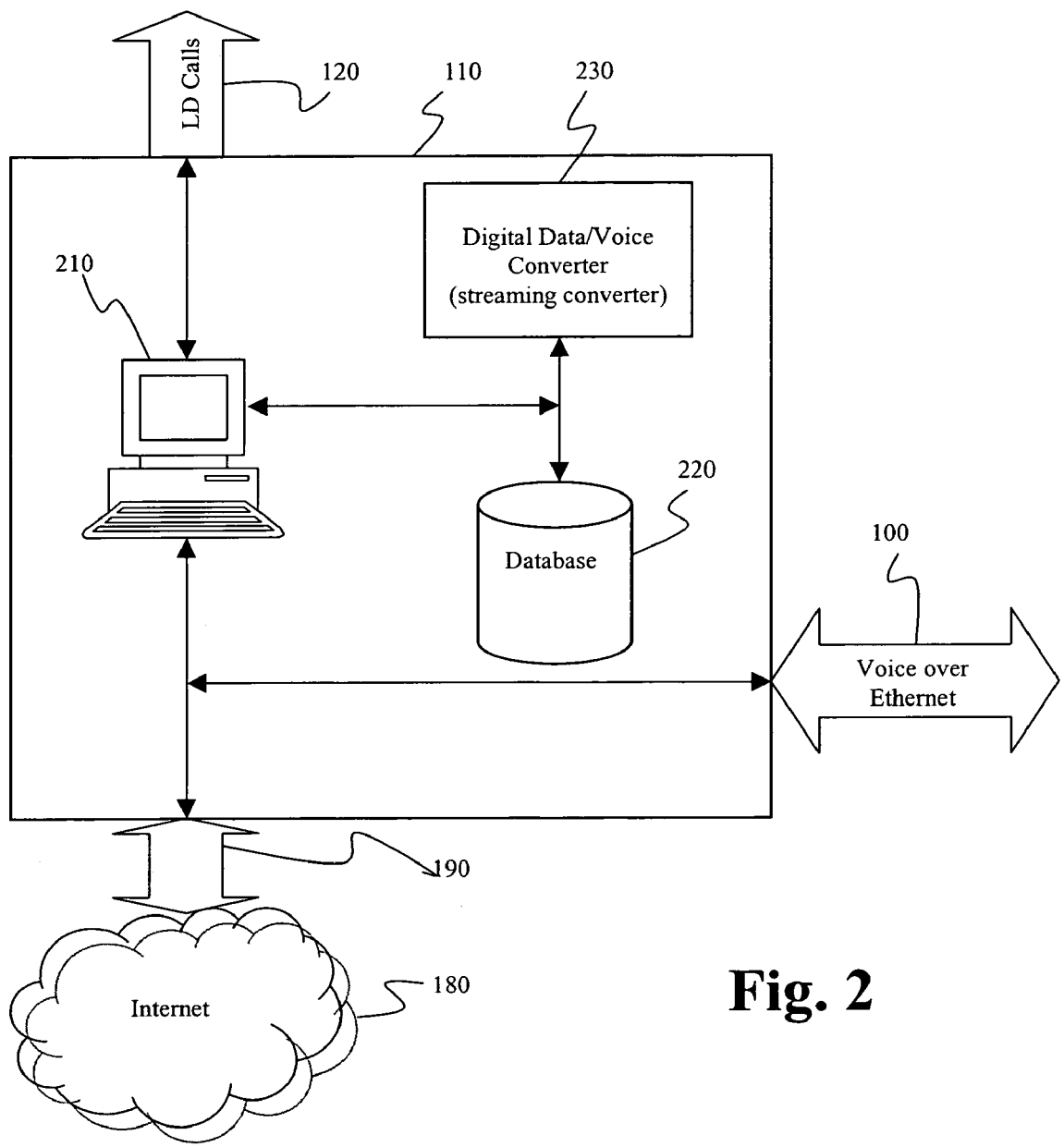
FIG. 2 representatively illustrates features within the central data center in accordance with present subject matter.

With reference now to FIG. 2, a more specific discussion of the operational aspects of central data center 110 will be undertaken. Central data center 110 is, in one embodiment of the present technology, a single central facility that is designed to function as a central repository of compressed voice data transported from a number of different origination telephones 10. It should be understood that, although a single origination telephone 10 has been illustrated for exemplary purposes, such single telephone 10 is meant to represent a number of telephone instruments, which may be physically located either singularly or in groups at a number of different facilities at a number of different physical locations. In an alternative embodiment, central data center 110 may correspond to a central facility for a subset of different facilities or may correspond to a backup facility which mirrors or substitutes for a primary facility should the primary facility experience technical difficulties. Such technical difficulties may include, but are not limited to, system overload or system failure an/or localized loss of power and/or Internet or other operatively required interface. Central data center 110 may also function as a central control facility with functions corresponding to inmate and corrections facility account maintenance and supervision as well as other functions not specific or relevant to the presently disclosed technology.

Central data center 110 as illustrated in FIG. 2 corresponds to a facility including such as a representative terminal 210 that is functionally coupled to digital data/voice converter device 230 as well as a data storage device 220. Central data center 110 is, as was discussed with reference to FIG. 1, coupled to the Internet 180 through bi-directional coupling mechanism 190, receives Voice over Ethernet through bi-directional coupling mechanism 100, and completes long distance calls through coupling element 120. Within central data center 110, terminal 210 corresponds, in many respects, to an onsite version of workstations 170, 170' discussed supra in that terminal 210 has at least all the capabilities of the workstations 170, 170'. Terminal 210 is illustratively shown as a personal computer, however, such is purely for illustration as the terminal 210 may be embodied as a personal computer, minicomputer, or mainframe computer with suitable control terminals or in any other form as may be desired or necessary such that, when coupled with other elements including, but not limited to the digital voice/data converter device 230 and storage device 220 at the central data center 110, has the capability to accomplish the desired functions of such as converting, storing, searching, retrieving, and playing back of compressed voice data. If additional functions as mentioned hereinabove relating to account management and other functions not directly related to the present technology are to be carried out as a part of the operations conducted at the central data center 110, additional computer capability may be required.

With respect to the present technology, terminal 210 works together with digital voice/data converter device 230 and storage device 220 to provide the capability to interface either locally or over the Internet with remote workstations such as workstation 170 to provide searchable access to previously recorded or ongoing, real-time conversations. As previously noted, highly compressed conversation data is stored in a related manner with identification data on the central data center's storage device 220. Such storage may be, but is not limited to, a so-called relational database arrangement. As previously mentioned with respect to the workstations 170, 170', a web-based program running on the workstation allows an operator to query the database stored on storage device 220. Any results from such a query are presented to the operator and a selection may be made from those presented results. If the operator chooses to listen to a recorded conversation, the selected compressed data is passed from storage device 220 to the digital data/voice converter 230 which converts the compressed voice data into a "streaming" format and passes the converted voice data back out over the WAN to workstation 170' or over the Internet 180 to one or more requesting workstation(s) 170. Since this data flow to workstations 170, 170' is via the WAN or Internet, it should be apparent that the methodology of the present subject matter allows monitoring of previously recorded conversations at any of multiple locations where access to the WAN or Internet is available. In like manner, the present technology permits on-line, real-time monitoring of inmates conversations by authorized personnel from anywhere access to the Internet is available. Of course, appropriate coded/protected limits to such remote access may be used in combination with the present technology, as desired. Such multiple location access to recorded or real-time conversations from world wide locations significantly improves law enforcement personnel's ability to conduct investigations involving communications between inmates and those outside, or even within, a corrections environment.

Thus there has been described an apparatus and methodology for recording, storing, searching, retrieving, and monitoring telephone conversation voice and related data recorded and stored at locations remote from the origination and/or destination locations of the telephone calls. Moreover the disclosed apparatus and methodology permits searchable access to such conversations from multiple remote locations either as previously recorded data or in real time.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An audio recording system, comprising:
a first telephone instrument located at a first location within a prison environment and configured for communications with a second telephone instrument located at a second location remote from said first location;
an analog to digital converter at said first location, having an input and an output, said first telephone instrument coupled to said input of said analog to digital converter; and
a data storage device located at a third location physically remote from said first location and said second location, said data storage device coupled to said output of said analog to digital converter, whereby conversation data from conversations conducted by way of said first telephone instrument may be recorded and stored at said third location physically remote from said first location and said second location.

2. An audio recording system as in claim 1, further comprising:
a wide area network coupled between said analog to digital converter and said data storage device.

3. An audio recording system as in claim 1, further comprising:
a data compressor coupled to said output of said analog to digital converter.

4. An audio recording system as in claim 1, further comprising:

a workstation coupled to said data storage device and configured to access recorded conversation data stored in said storage device.

5. An audio recording system as in claim 4, wherein said workstation is coupled to said storage device via a wide area network, and wherein said workstation is configured to search accessed recorded conversation data.

6. An audio recording system as in claim 1, further comprising:
a workstation coupled to said analog to digital converter and configured to access ongoing conversations.

7. An audio recording system as in claim 6, wherein said wide area network is the Internet.

8. An audio monitoring and recording system, comprising:
a first telephone instrument located at a first location within a prison environment and configured for communications with a second telephone instrument located at a second location;
an analog to digital converter at said first location having an analog input and a digital output, said first telephone instrument coupled to said input of said analog to digital converter;
a storage device located at a third location physically remote from said first location and said second location coupled to said output of said analog to digital converter, said storage device being configured to store recorded conversation data files corresponding to said digital output of said analog to digital converter;
a streaming converter coupled to said storage device; and
a workstation coupled to said streaming converter,
whereby audio originating from said telephone instrument may be monitored at said workstation.

9. An audio monitoring and recording system as in claim 8, wherein said streaming converter may be selectively coupled to said output of said storage device whereby a previously recorded conversation may be monitored.

10. An audio monitoring and recording system as in claim 8, wherein said streaming converter may be selectively coupled to said output of said analog to digital converter whereby an ongoing conversation may be monitored.

11. An audio monitoring and recording system as in claim 8, wherein conversation identifying data is associated with said recorded conversation data files stored on said storage device, and wherein said workstation is configured to perform logical searches of said conversation identifying data.

12. An audio monitoring and recording system as in claim 8, wherein said workstation is configured to perform searches of said conversation data.

13. An audio monitoring system as in claim 12, wherein said workstation is coupled to said streaming converter by way of a wide area network.

14. An audio monitoring and recording system as in claim 13, wherein the wide area network is the Internet.

15. An audio retrieval system, comprising:
a storage device configured to store data files corresponding to recorded conversations conducted between a first telephone instrument at a first location within a prison environment and a second telephone instrument at a second location, said storage device being located at a third location remote from both said first and second locations;
a streaming converter coupled to said storage device; and
a workstation remotely located at a fourth location remote from each of said first, second, and third locations coupled to said streaming converter, whereby audible reproductions of said recorded conversations may be monitored at said workstation.

16. An audio retrieval system as in claim 15, wherein conversation identifying data is associated with said data files stored on said storage device and said workstation is configured to perform logical searches of said conversation identifying data.

17. An audio retrieval system as in claim 15, wherein said workstation is configured to perform searches of said data files.

18. An audio retrieval system as in claim 15, wherein said workstation is coupled to said streaming converter by way of a wide area network.

19. An audio retrieval system as in claim 18, wherein the wide area network is the Internet.

20. A specialized phone system for use in relation to a prison environment, having an audio recording system, comprising:
a first telephone instrument located at a first location situated within a prison facility and configured for communications with a second telephone instrument located at a second location remote from said first location;
an analog to digital converter at said first location, having an input and an output, said first telephone instrument coupled to said input of said analog to digital converter; and
a data storage device located at a third location comprising a defined central data center physically remote from both said first location and said second location, said data storage device coupled to said output of said analog to digital converter, whereby inmate conversation data from inmate conversations conducted by way of said first telephone instrument may be recorded and stored at said central data center physically remote from said prison facility.

21. A specialized phone system as in claim 20, further comprising:
a wide area network coupled between said analog to digital converter and said data storage device.

22. A specialized phone system as in claim 20, further comprising:
a data compressor coupled to said output of said analog to digital converter.

23. A specialized phone system as in claim 20, further comprising:
a workstation coupled to said data storage device and configured to access recorded inmate conversation data stored in said storage device.

24. A specialized phone system as in claim 23, wherein said workstation is coupled to said storage device via a wide area network, and wherein said workstation is configured to search accessed inmate recorded conversation data.

25. A specialized phone system as in claim 20, further comprising:
a workstation coupled to said analog to digital converter and configured to access ongoing inmate conversations.

26. A specialized phone system as in claim 20, further comprising:
a streaming converter coupled to said data storage device; and
a workstation coupled to said streaming converter,
whereby inmate conversations originating from said telephone instrument may be monitored at said workstation.

27. A specialized phone system as in claim 20, wherein inmate conversation identifying data is associated with said recorded conversation data files stored on said data storage device, and wherein said workstation is configured to perform logical searches of said inmate conversation identifying data.

* * * * *